US012487336B2

(12) United States Patent
Lu et al.

(10) Patent No.: US 12,487,336 B2
(45) Date of Patent: Dec. 2, 2025

(54) CALIBRATION SYSTEM AND METHOD FOR INTEGRATED OPTICAL PHASED ARRAY CHIP

(71) Applicant: Shanghai Jiao Tong University, Shanghai (CN)

(72) Inventors: Liangjun Lu, Shanghai (CN); Weihan Xu, Shanghai (CN); Linjie Zhou, Shanghai (CN); Jianping Chen, Shanghai (CN); Jiao Liu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 1005 days.

(21) Appl. No.: 17/561,907

(22) Filed: Dec. 24, 2021

(65) Prior Publication Data
US 2022/0197106 A1    Jun. 23, 2022

Related U.S. Application Data

(63) Continuation of application No. PCT/CN2021/079671, filed on Mar. 9, 2021.

(30) Foreign Application Priority Data

Dec. 18, 2020   (CN) ......................... 202011502569.X

(51) Int. Cl.
*G02F 1/295* (2006.01)
*G01S 7/481* (2006.01)
(Continued)

(52) U.S. Cl.
CPC ............ *G01S 7/4817* (2013.01); *G01S 7/497* (2013.01); *G02F 1/292* (2013.01); *G02F 1/2955* (2013.01)

(58) Field of Classification Search
CPC .................................................. G02F 1/2955
See application file for complete search history.

(56) References Cited

U.S. PATENT DOCUMENTS

| 2020/0158839 | A1  | 5/2020 | Lin et al. |
| 2021/0063842 | A1* | 3/2021 | Byun ............... H01S 5/4075 |

FOREIGN PATENT DOCUMENTS

| CN | 108363051 A | 8/2018 |
| CN | 111948626 A | 11/2020 |

(Continued)

OTHER PUBLICATIONS

Hulme et al. Fully integrated hybrid silicon two dimensional beam scanner, Optics Express vol. 23, No. 5, pp. 5861-5874 (Year: 2015).*

(Continued)

*Primary Examiner* — David P Porta
*Assistant Examiner* — Shun Lee
(74) *Attorney, Agent, or Firm* — Mei & Mark LLP; Manni Li

(57) ABSTRACT

A calibration system and related methods for optical phased array chips. The calibration system includes an adjustable mount module, an infrared microscopic observation module, an arrayed driver module, a two-dimensional laser beam scanning module, a photoelectric conversion module and an upper computer, and utilizes computer-vision-enabled positioning and phase error compensation algorithms as software components. Collimated laser is emitted from the target beamforming angle and aimed at the emission aperture of the chip, and is subsequently sampled by the array elements in a reversed injection manner. Based on the reciprocity of light propagation, by maximizing the power reversely output from the bus waveguide of the optical phased array chip, beamforming at the target angle is achieved supported by software implementations of optimization algorithms. The (Continued)

system and related methods are readily achievable, highly automated, and offers fast and batch calibration with relatively low expenses, good flexibility and long-term compatibility.

10 Claims, 7 Drawing Sheets

(51) Int. Cl.
  *G01S 7/497* (2006.01)
  *G02F 1/29* (2006.01)

(56) References Cited

FOREIGN PATENT DOCUMENTS

| | | |
|---|---|---|
| CN | 112034657 A | 12/2020 |
| CN | 112051560 A | 12/2020 |
| WO | WO 02/097382 A2 | 12/2002 |

OTHER PUBLICATIONS

Moritex Corporation Machine Vision System vol. 3, pp. 1, 17, 18, and 41 (Year: 2019).*

Tyler et al. Characterization of SiN integrated optical phased arrays on a wafer-scale test station, Journal of Visualized Experiments vol. 158, e60269, 10 pages (Year: 2020).*

Heertjes et al. Control of Wafer Scanners: Methods and Developments, 2020 American Control Conference, pp. 3686-3703 (Year: 2020).*

Le Thomas, Houdré et al., "Exploring light propagating in photonic crystals with Fourier optics," Journal of the Optical Society of America B/ vol. 24, No. 12, pp. 2964-2971 (Dec. 2007).

Hutchison, David, et al., "High-resolution aliasing-free optical beam steering," Optica, vol. 3, No. 8, pp. 887-890 (Aug. 2016).

Tyler, Nichola A. et al., "SiN integrated optical phased arrays for two dimensional beam steering at a single near infrared wavelength," Optics Express, vol. 27, No. 4, pp. 5851-5858 (Feb. 18, 2019).

Shin et al., "Chip-scale blue light phased array," Optics letters, vol. 45, No. 7, pp. 1934-1937 (Apr. 1, 2020).

Tyler, N.A. et al., "Characterization of SiN Integrated Optical Phased Arrays a Wafer-Scale Test Station," Journal of Visuallized Experiments, vol. 158, e60269, pp. 1-9 (Apr. 2020).

Doylend, J.K. et al., "Two-dimensional free-space beam steering with an optical phased array on silicon-on-insulator," Optics Express, vol. 19, No. 22, pp. 21595-21604 (Oct. 24, 2011).

Qi-Hao Zhang et al., "Antenna Array Initial Condition Calibration Method for Integrated Optical Phased Array," Acta Photonica Sinica, vol. 49, No. 7, 726001, pp. 1-11 (Jul. 2020).

Phare, C.T., et al., "Silicon Optical Phased Array with Grating Lobe-Free Beam Formation Over 180 Degree Field of View," Conference on Lasers and Electro-Optics, SM3I.2, pp. 1-2 (2018).

Komljenovic, T., et al., "On-chip calibration and control of optical phased arrays," Optics Express, vol. 26, No. 3, pp. 3199-3210 (Feb. 5, 2018).

* cited by examiner

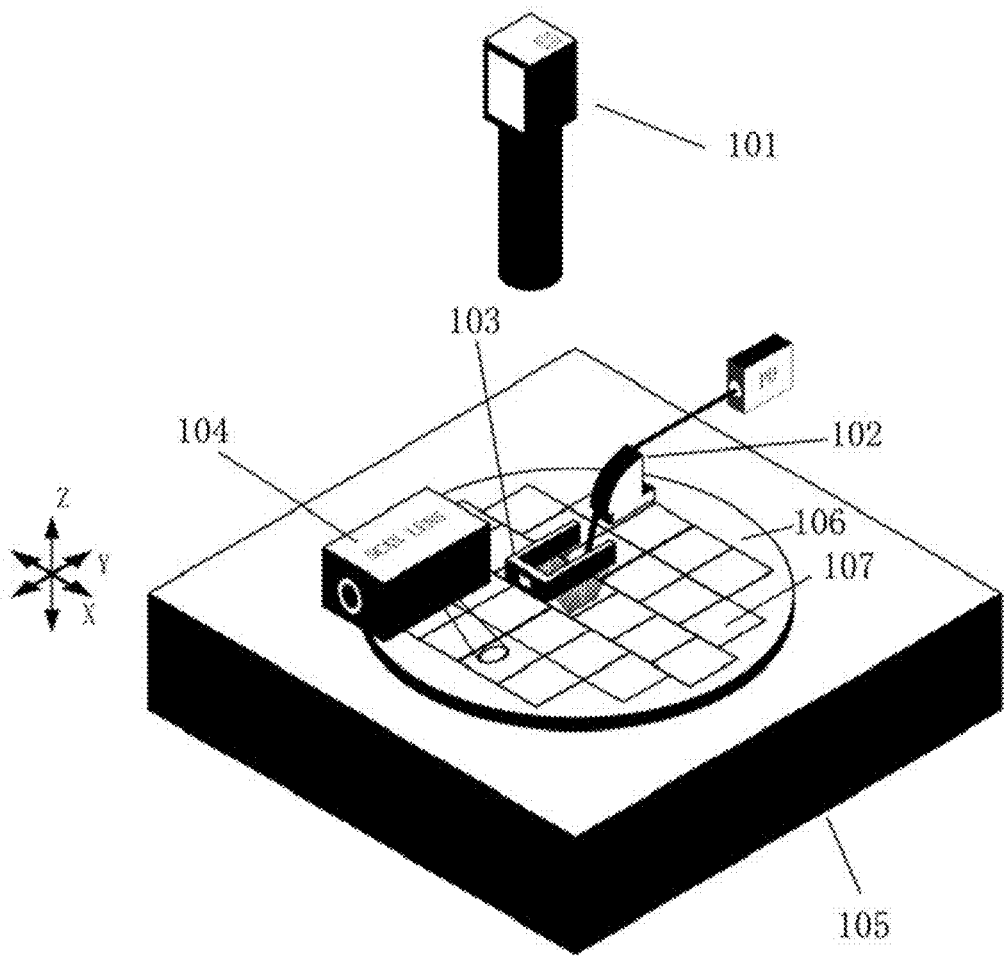

FIG. 1

Collimated laser is reversely injected to a to-be-calibrated optical phased array chip (the current DUT), and coherent beam combination is performed within the DUT — S201

Driving parameters, especially the driving signals applied to phase shifters of the DUT are adjusted to maximize the optical power output from the bus waveguide of the DUT, thereby achieving phase alignment of the chip for the current angle. — S202

FIG. 2

$$|\vec{a}+\vec{b}| \leq |\vec{a}| + |\vec{b}|$$

CALIBRATION SYSTEM AND METHOD FOR INTEGRATED OPTICAL PHASED ARRAY CHIP

CROSS-REFERENCE TO RELATED APPLICATIONS

The subject application is a continuation of PCT/CN2021/079671 filed on Mar. 9, 2021, which claims priority on Chinese Application No. 202011502569.X filed Dec. 18, 2020, in China. The contents and subject matter of the PCT international application and Chinese priority application are incorporated herein by reference.

TECHNICAL FIELD

The present invention relates to testing and characterization of chip-scale photonic integrated circuits (PICs), in particular to a calibration system and related methods for integrated optical phased arrays (OPAs).

BACKGROUND ART

A chip-scale coherent laser beam controller based on the principle of optical phased arrays, shortened as an OPA chip, which hereinafter refers to both a bare chip in a wafer and a chip packaged in an optical phased array transceiver module, is the key component in a solid-state scanning LiDAR; such a laser beam control technology not only thoroughly gets rid of mechanical elements limiting scanning speeds, but also enables digitalized yet seamless scanning by virtue of flexible beam-forming and high directional gain, thereby breaking the tradeoff between scanning capability and scanning flexibility commonly found in other solutions such as an MEMS (Micro-Electro-Mechanical System) galvanometer. In addition, as a high-speed and high-performance solid-state laser beam controller, OPA chips may also be used in various fields such as holograms, virtual reality, and free space optical communication, which subsequently enables innovative approaches for sensing and communication in the 5G and post-5G era.

For chips produced on a massive scale, wafer-level characterization is an important part for evaluating processing quality and correcting process errors. In essence, the feasibility of the production flow and the cost of a final chip unit is directly dependent on the degree of automation, efficiency, and accuracy of the wafer-level testing; while for optical phased array transceivers deployed in the field, high-throughput calibration solutions are also required by the packaged chips when they are returned to the factory to compensate for deviation after high-load operation in severe weather and element conditions. Therefore, a calibration system not only determines the overall cost for a LiDAR product, but also serve as the foundation for the system-level safety of the solutions. The provision of a system which is highly automatic and can be applied to both batch and wafer-level characterization for the optical phased array chip has key significance to the application and promotion of the device.

So far, the test of the OPA chip is mainly completed independently by scientific research institutions or development groups adopting various test configurations which are low in degree of standardization and degree of automation and bring more customized solutions to facilitate verification and representation of individual claims. The test throughput is relatively low, and the evaluation results are not comparable. The current level of testing is limited by the fact that two parts of different scale, namely on-chip optical field control and free space beam quality evaluation, are done in conjunction when calibrating an optical phased array chip. More specifically speaking, the free space beam quality evaluation provides feedback for the on-chip optical field control, and the on-chip optical field control is completed by the tuning of driving circuits according to the feedback. The most widely adopted free space beam quality evaluation solution is the Fourier optical imaging system (Le Thomas, Houdré et al., Journal of the Optical Society of America B, 24, 2964-2971, 2007) or an imaging system improved on this basis (Hutchison, Sun et al., Optica, 3, 887-890, 2016). More general approaches are also implemented through free space propagation of the field and the direct or indirect mapping to the sensor plane of a SWIR camera (Tyler, Fowler et al., Optics Express, 27, 5851-5858, 2019) and sometimes, a reference object/surface is used to assist the test (Chul Shin, Mohanty et al., Optics letters, 45, 1934-1937, 2020).

To sum up, all the aforementioned methods involve the process where the far field pattern of the chip is directly or indirectly mapped on a sensor plane of a camera to generate a representation of the far field within a certain field of view (FOV) for beam quality evaluation. The aforementioned calibration system is widely applied, and a wafer-level characterization solution has been preliminarily developed (Tyler, Guerber et al., JoVE, 158, e60269, 2020). However, since these systems depend on the number of pixels and scale of the sensor of an infrared camera, a natural tradeoff is formed between the refresh rate, the field of view and the angular resolution of the FOV. In most setups the refresh rate of the FOV, especially when no region of interest (ROI) is selected, is also relatively low (30-60 Hz), while high-speed feedback is crucial to the calibration of OPAs of high channel count. In addition, no matter which imaging method is adopted, the imaging system is required to be calibrated in advance, so that reference information of the FOV is acquired. In order to effectively solve problems such as low speed and FOV limitation caused by the adoption of a SWIR camera as a beam quality evaluation device, an off-chip single-pixel photodetector and a testing mount with actuators (proposed by Doylend, Heck et al., Optics Express, 19, 21595-21604, 2011) are combined to perform the beam-forming experiment, which is further verified numerically by Qi-hao, Ling-xuan et al., (Acta Photonica Sinica, 49, 726001, 2020) to converge to the optimal solution. A similar calibration method was also developed by research groups at Columbia Universality (Phare, Shin et al., Conference on Lasers and Electro-Optics, SM3I.2, 2018) where a galvanometer system and a single-pixel photodetector are used in combination. Finally, by using the type of solution based on the theoretical proposal of Komljenovic et al., (Komljenovic and Pintus, Optics Express, 26, 3199-3210, 2018), relatively efficient beam-forming may be achieved through the simplification of the sensor, however, the calibration process is not fully automated, and no beam-forming can be achieved at directions other than the broadside of the array, rendering it not ready for universal adoption.

SUMMARY OF THE INVENTION

The present invention provides a calibration system and related methods for the OPA chips based on the reciprocity of light propagation. Problems such as low degree of standardization and automation of the existing testing system are solved, related hardware and software components are readily available, so much so that most components can be constructed from commercial apparatuses. The system and methods are sound, efficient, and are particularly applicable to both wafer-level testing of OPA chips and batch calibration of packaged OPA transceiver or, therefore possessing high application values.

To realize the aforementioned purpose, the present invention adopts the following technical solutions.

The calibration methods for OPA chips of the present invention comprises the following steps:

reversely injecting collimated laser to an OPA chip under calibration (shortened as DUT, device under test, again referring to both an OPA chip in a wafer or an OPA chip packaged in a module) in order to perform coherent beam combination on the collimated laser within the DUT; and by adjusting operation parameters, e.g., the phase-shift of individual channel of the DUT to maximize optical power output from the bus waveguide of the DUT, state calibration of the chip can be achieved.

Further, when the collimated laser is reversely injected to the DUT, the collimated laser is irradiated on the emission aperture of the OPA chip.

Further, when the collimated external laser is adjusted for reversed injection, a coarse adjustment step and a fine adjustment step are included, wherein the coarse adjustment step compensates the horizontal (X/Y) displacement due to change in the input angle by deriving an overlap ratio between the light spot of the collimated laser and the array emission aperture guided by computer vision; and the fine adjustment step comprises acquiring the optical power from the bus of the DUT, and maximizing the power by adjusting the relative positions of the DUT and a two-dimensional laser beam scanning module, e.g., a galvanometer laser beam scanner.

Further, when the parameters of the DUT are adjusted, the adjusted parameters include phase compensation value of the phase shifter in the individual channel of the DUT.

Further, adjusting the phase compensation values of the phase shifters includes the following steps:

reversely injecting collimated laser from the target beam-forming angle (different angles can be applied in different calibration runs), acquiring the optical power from the coherent beam combination in the bus waveguide, and performing optimization by using a phase compensation algorithm to obtain optimal electric driving signals required by all phase shifters for beamforming at the current angle.

Further, the aforementioned phase compensation algorithm can be realized with either the golden-search-enabled rotating-element electric-field vector (REV) method, the hill-climbing algorithm, the simplex optimization method, or the Gaussian process-based search (GPS).

The present application further provides a calibration system for OPA chips both in terms of wafer-level testing of OPA chips and batch calibration of packaged OPAs in transceivers, and comprises:

an infrared microscopic observation module used to acquire the spot image of the collimated laser on the surface of the DUT during the coarse alignment phase for reversed injection;

a two-dimensional laser beam scanning module used for providing collimated laser and capable of adjusting the emitting/injection angle of the collimated laser;

an adjustable mount module used for holding and moving the DUT;

a photoelectric conversion module used to measure the optical power from coherent beam combination in the bus waveguide of the DUT;

an arrayed driver module connected to the phase shifters of the DUT to provide electric driving signals for phase error compensation; and an upper computer connected to the arrayed driver module and used for accessing and controlling the arrayed driver module to finally tune the phase shift in individual channel of the OPA chip and store the optimized driving parameters.

Further, the infrared microscopic observation module comprises: an actuated multi-axis mount; a microscope; and an infrared camera, connected with a lens barrel of the microscope by a camera adapter, wherein the lens barrel of the microscope is fixed to the actuated multi-axis mount, and the microscope may also incorporate a beam splitter module to further provide an observation port for a visible light camera in case colored computer vision techniques are preferred.

Further, the two-dimensional laser beam scanning module is based on either a galvanometer laser beam scanner or a pre-calibrated OPA beam-steerer and is used for the reversed injection of the collimated external laser.

Further, to achieve wafer-level testing, the arrayed driver module comprises a multi-channel programmable power source (shortened as PMU: power management unit) and a medium or large-scale densely-arrayed probe card depending on the scale of the DUT, interfacing between the PMU and the DUT so as to drive and adjust the phase shifters to achieve wafer-level test; and to achieve batch calibration for OPAs packaged in LiDAR transceivers, the on-board PMU, either co-integrated within the chip or co-packaged in the module by the original manufacturer, is accessed through the interface via the communication protocol specified by the original manufacturer for the calibration system to drive the DUT and adjust the phase shifters accordingly. For both cases, standardization could be pioneered by specialized calibration service provider given the consent and cooperation of the client to facilitate the implementation of the arrayed driver module.

Further, each of the phase shifters comprises a tunable waveguide section with electric connections by which external control signals are converted into optical path changes to introduce a phase shift, and an optical field control mechanism including but not limited to the thermo-optical effect, the free carrier plasma dispersion effect, the piezoelectric effect, and the electro-optic effect of birefringent crystals.

Further, the photoelectric conversion module is connected to the bus waveguide of the optical phased array chip in the form of a photodetector.

Further, the adjustable mount module comprises a clamping unit and an actuated six-axis positioning stage, and the clamping unit provides mechanical adaptation between the DUT and the actuated six-axis positioning stage.

Compared to prior arts, significant improvements are achieved in the following aspects:

For the calibration system and method of the present invention, directional reception and beam quality evaluation in prior arts are converted into directional reversed injection based on the reciprocity of light propagation, and the off-chip beamforming is converted into the in-chip coherent combining, so that free-space beam quality evaluation is removed from the calibration process, the automation potential of calibration is maximized, and subsequently, providing an effective means for high throughput testing of large-scale DUTs. Therefore, wafer-level testing or batch calibration are simplified, accelerated and less susceptible to distortion and fluctuation introduced by the beam quality evaluation.

The calibration system of the present invention is widely applicable to OPA chips of different scales and aperture sizes leveraging on mature laser beam expanders and collimators that are universally available, and the reversed injection method is wavelength transparent with few to no limitations. Especially, the system has outstanding advantages for chips with large aperture sizes whose beam quality converges over a long distance, subsequently resulting in sub-optimal beam quality evaluation and, in extreme cases, invalid feedback for prior arts. For the reversed injection method, the laser is collimated before illuminating the emission region of the OPA, condensing the convergence distance at little to no expense of the calibration process.

In the present invention, all the modules and component of the calibration system are readily available, highly automated, relatively affordable compared to prior arts dependent on high performance SWIR cameras. The modular nature of the system trades complexity for the possibility of incremental deployment, sustainability in maintenance and upgrade, and overall flexibility which is crucial for calibration service provider to adapt and provide both custom and standard calibration based on existing hardware.

The calibration method of the present invention has a logically clear process on the software level, is applicable to other types of hardware and hardware interfaces and constitute no bottleneck to achieve a good software portability across different environments.

BRIEF DESCRIPTION OF THE DRAWINGS

FIG. 1 shows the structure of the calibration system in one embodiment of the present invention.

FIG. 2 shows the main process of the calibration method stepwise in one embodiment of the present invention.

DETAILED DESCRIPTION OF THE INVENTION

Figure 3A:
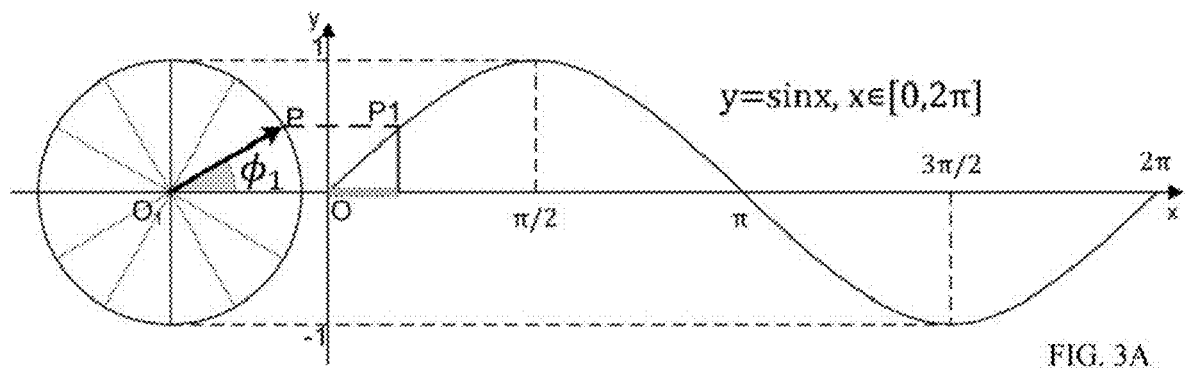
FIGS. 3A, 3B, and 3C show complex plane vector representations of complex amplitudes of optical plane waves and the relationship between the phases of the waves and the angles of the vectors in the present invention.
Figure 3B:
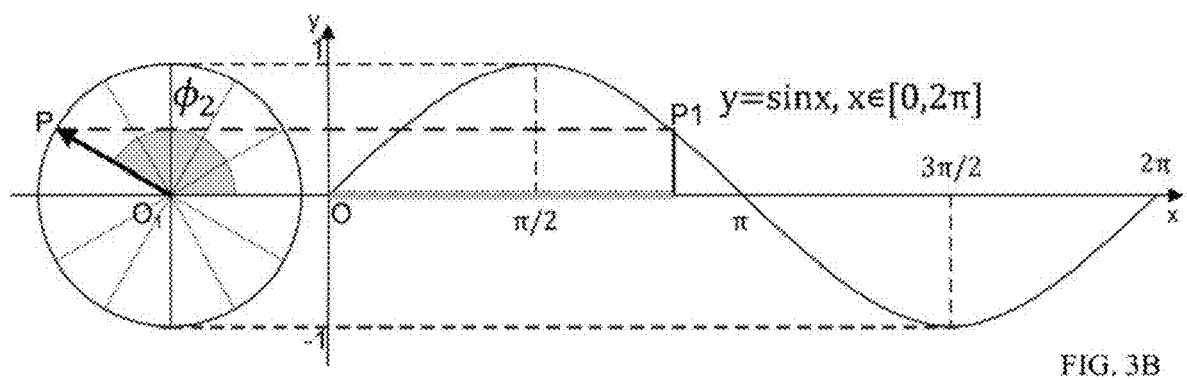
Figure 3C:
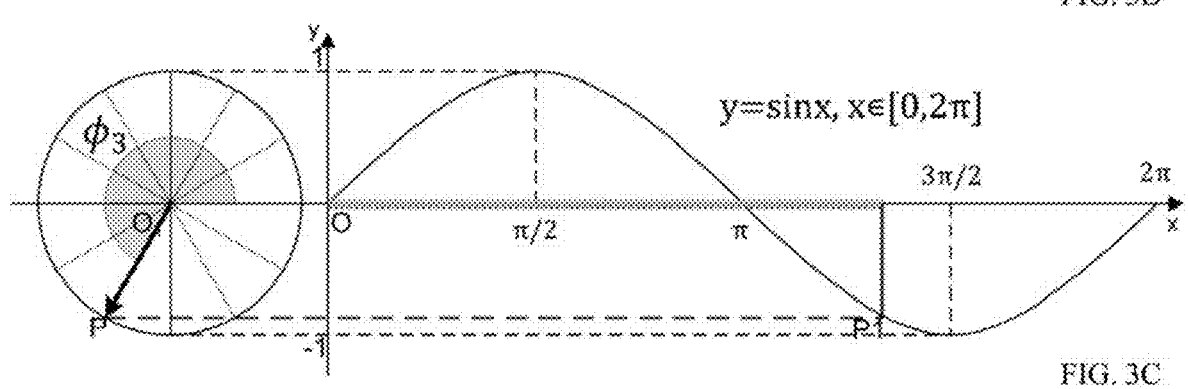
Figure 4:
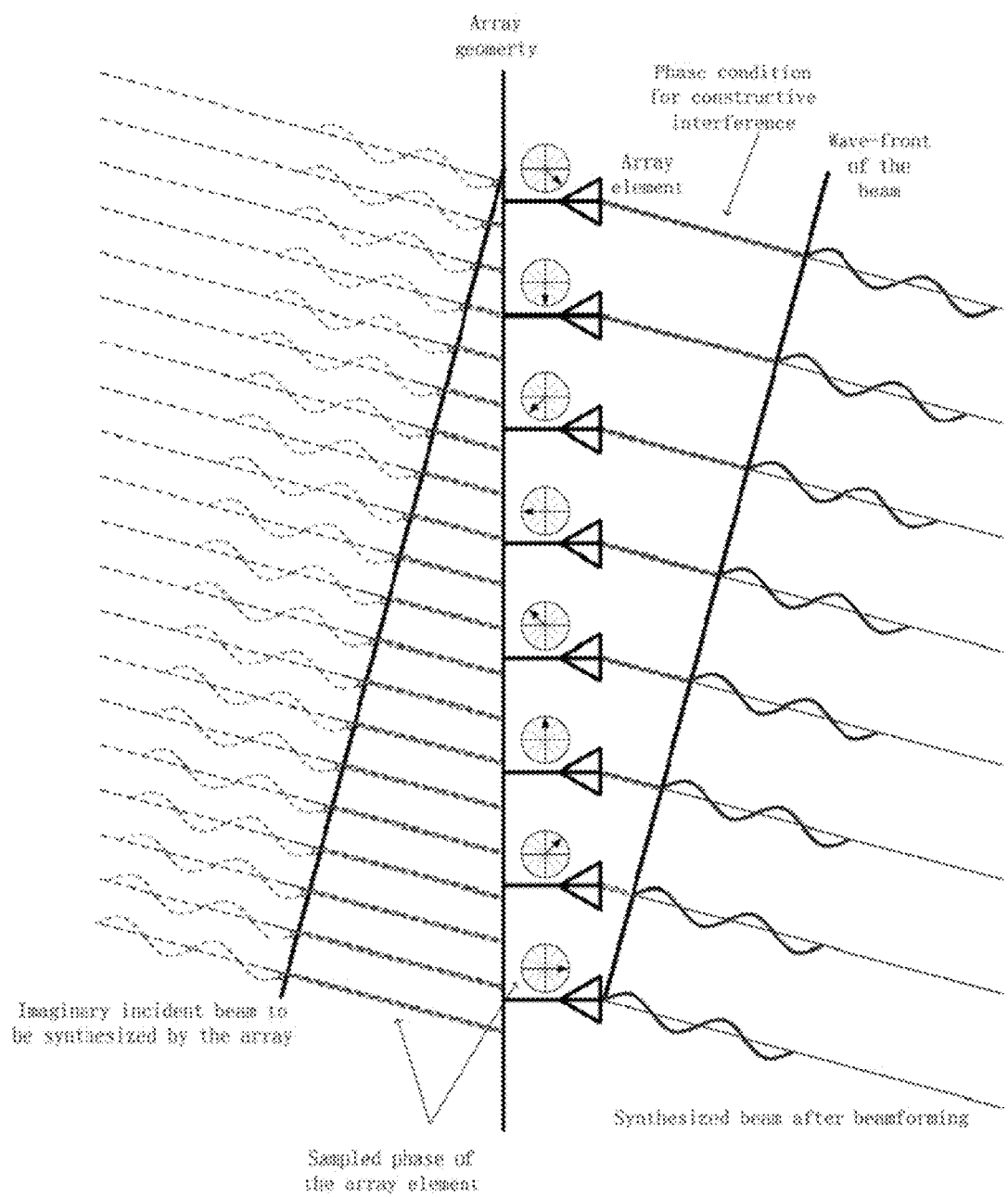
FIG. 4 shows the beamforming principle of OPAs based on the concepts and notations provided in FIGS. 3A to 3C.

Specific implementation manners of the present invention are described in detail below in conjunction with the accompanying drawings and embodiments in a wafer-level testing scenario. It should be understood by practitioners in related industries that a chip in an OPA transceiver module has been provided with substantial packaging in the form of optical and electrical interfaces and in some cases onboard controllers. And as long as the packaging is intact and functioning, which can be validated through typical circuit fault diagnosis and is irrelevant for the characterization of the chip, the batch calibration process is generally facilitated by the module and has lower complexity and difficulty than the wafer-level testing as an embodiment of the proposed system and methods. In other words, the system required for batch calibration of packaged chips can be configured on the basis of a wafer-level testing system with reduction of equipment and apparatus, where a probe card and an actuated optical coupling are replaced by the electric and optical interfaces of the module. Therefore, the presented embodiment is mainly described for a wafer-level testing scenario which is more complicated and comprehensive, while suggestions and guidelines are provided concerning how the system can be extended to accommodate the batch calibration of packaged OPA transceivers.

One embodiment of the present application provides a calibration system for the wafer-level testing of OPA chips. As shown in FIG. 1, the structure of the calibration system for the OPA chip 107 is used for wafer-level testing, and comprises an infrared microscopic observation module 101, a two-dimensional laser beam scanning module 104, an adjustable mount module 105, a photoelectric conversion module 102, an arrayed driver module 103, and an upper computer. The adjustable mount module 105, the arrayed driver module 103 and the two-dimensional laser beam scanning module 104 are successively arranged from bottom to top in the calibration system.

The optical phased array chip 107 contains phase shifters for phase error compensation and the introduction of interchannel phase difference, each of the phase shifters comprises a tunable waveguide section with electric connections by which external control signals are converted into optical path changes to introduce a phase shift, and an optical field control mechanism including but not limited to the thermo-optical effect, the free carrier plasma dispersion effect, the piezoelectric effect, and the electro-optic effect of birefringent crystals.

The infrared microscopic observation module 101 is used to acquire the spot image of the collimated laser on the surface of the DUT, i.e., the OPA chip 107. The infrared microscopic observation module 101 comprises an actuated multi-axis mount; a microscope; and an infrared camera, connected with a lens barrel of the microscope by a camera adapter, wherein the lens barrel of the microscope is fixed to the actuated multi-axis mount, and the microscope may also incorporate a beam splitter module to further provide an observation port for a visible light camera in case colored computer vision techniques are preferred.

The aforementioned camera adapter uses typical mechanical components including a C-mount adapter, and the actuated multi-axis mount can move in both X-Y direction.

The two-dimensional laser beam scanning module 104 is used to provide collimated laser and capable of adjusting the emitting/injection angle of the collimated laser for reversed injection, thereby adjusting the incident angle of the laser to the optical phased array chip 107. A user may align the laser beams at different angles to the emission aperture of the DUT based on the camera feedback of the infrared microscopic observation module 101, and subsequently, achieving reversed injection from the desired angle into the OPA chip.

The two-dimensional laser beam scanning module 104 can be realized with either a galvanometer laser beam scanner or a pre-calibrated OPA beam-steerer. The two-dimensional laser beam scanning module is mounted on the actuated multi-axis mount and is capable of emitting parallel light from any pitch angles and azimuth angles, thereby achieving reversed injection in a desired direction.

More specifically, the two-dimensional laser beam scanning module 104, in this embodiment a commercial galvanometer laser beam scanner, is deployed according to the following procedures. To prepare for the calibration at a given beamforming angle, firstly, the two-dimensional laser beam scanning module 104 is set to the corresponding reversed injection angle, at the moment, due to the oblique illumination of the collimated laser beam, the position of the spot deviates from the targeted emission region of the OPA chip 107, the laser spot is observed via the infrared camera, and the light beam at such an angle is aligned to the emission aperture of the OPA chip 107 under the feedback of the infrared camera by virtue of the actuated multi-axis mount of the laser beam scanning module in the X-Y direction, so that the wavefront of the planar wave is sampled by the optical phased array under test. Now, the position of the two-dimensional laser beam scanning module 104 is finely adjusted according to the optical power feedback from the photoelectric conversion module 102 to achieve better position alignment so that it becomes possible start calibration and optimization.

The adjustable mount module 105 is used for holding and moving the DUT 107. The adjustable mount module 105 comprises a clamping unit and an actuated six-axis positioning stage, the clamping unit provides mechanical adaptation between the DUT and the actuated six-axis positioning stage. The traveling ranges of the actuated six-axis positioning stage in the X-Y directions are greater than that in the Z axis so that the reversed injection setup (including two-dimensional laser beam scanning module 104, the photoelectric conversion module 102, and the arrayed driver module 103) can be transferred between different DUTs in the same wafer. The adjustments in the Z axis and the angular axis corresponding to the Euler angles (pitching, yawing, and rolling) are highly precise while relatively small in tunable range, and they are used to ensure that the surfaces of the DUTs are horizontal and the transfer between different DUTs is smooth. By using the adjustable mount module 105, switching among the DUTs can be conveniently achieved by horizontally moving in the X-Y axis of the 105. There are matured commercial products provided as the clamping unit and the actuated multi-axis positioning system to be immediately adopted or conveniently customized, the descriptions thereof are omitted herein.

As previously mentioned, the adjustable mount module 105 may move the optical phased array chips 107 with a wide travelling range, so that different DUTs in the wafer are moved to the testing region under the setup. It should be noted that other modules are also provided with multi-axis actuated mounts, though with relatively smaller travelling range and higher position precision. The adoption of such a configuration ensures that the switching among the DUTs 107 is rapid and accurate, and it is convenient to achieve wafer-level testing 106. It is obvious that by using a customized clamping unit, the adjustable mount module can be used to carry multiple packaged OPA transceivers for batch calibration.

More specifically, for a wafer-level testing scenario, a plurality of DUTs 107 of the same type are included in the same wafer 106, and the adjustable mount module 105 may move the wafer 106 with a large travelling range in the horizontal directions, thereby moving the DUT to the test region under the setup. The Z axis and the angular axis (pitching, yawing, and rolling) of the adjustable mount module 105 are configured to shorten the switching time among the DUTs 107 while also avoiding collision and abrasion between the DUT and the setup. After the positions of the modules in the reversed injection setup have been optimized with respect to one DUT, and the corresponding calibration is accomplished, it is unnecessary to adjust the positions of those modules, by slightly lowering the wafer 106 with the adjustable mount module 105 and moving the entire wafer horizontally so that another DUT is under the setup under camera feedback, the setup is transferred to another optical phased array chips 107 with little or no further compensation required, and then, the wafer 106 is ascended to the testing height to establish electric connections between the DUT and the setups. Apparently, batch test of the packaged optical phased array transceiver may be supported in an equivalent manner.

The photoelectric conversion module 102 is connected to the bus waveguide of the optical phased array chip 107 in the form of a photodetector and is used for acquiring the optical power in the bus waveguide of the OPA chip 107 after coherent combining. The photoelectric conversion module 102 is designed according to the optical coupling implementation of the on-chip test port, and when permitted, the photoelectric conversion module may be integrated in the OPA chip 107 and is tapped into the bus waveguide by virtue of a power splitting device including a directional coupler. In the latter case, the photodetector arranged in the chip performs photoelectric conversion and outputs the measured optical power as a feedback control signal via electric connection in the arrayed probe card in the form of a photocurrent. Therefore, no additional deployment process is required in the latter case and the corresponding feedback characteristics have been acquired through the deployment procedures of the arrayed driver module 103. In the former case, the optical alignment is typically optimized with the help of paired alignment ports as a reference or in a computer vision enable approach similar to that used to align the reversed injected beam to the emitting aperture. For optimal power coupling both into the chip and out from the bus waveguide of the chip, multiple rounds of alignment of both the 2D laser beam scanning module 104 and the photoelectric conversion module 102 may be required, though the calibration of phase errors within the chip is not sensitive to the quality of the coupling as long as the coupling remained steady.

Figure 10:
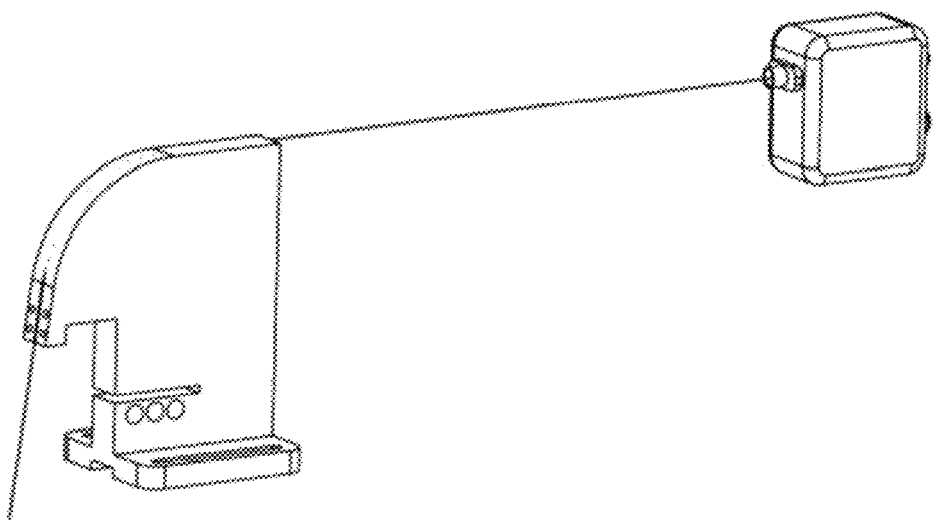
FIG. 10 shows one embodiment of a photoelectric conversion module in the present invention.

More specifically for the former case, in some other embodiments, when an optical phased array chip does not integrate an on-chip photoelectric conversion module 102 either due to the design or the tape-out process, an off-chip photodetector must be adopted and aligned to the optical coupling of the bus waveguide. The original input port of the bus waveguide is now adopted as the coupling target of the off-chip photoelectric conversion module with optical coupling, which is illustrated in FIG. 10. The coupling may be performed with devices including a flat-end fiber or a lensed fiber as the optical power collector, and the collected optical signal is transmitted to the off-chip photodetector to retrieve the photocurrent information which is then used as a feedback for the optical power required by the alignment and calibration process. Since there are no significant demands on the overall bandwidth in the calibration process, the photodetector and the electric connection are allowed to be implemented at low cost with traditional designs.

Again, it should be emphasized that the calibration system has a relatively low requirement on the quality of the optical coupling (i.e., the insertion loss) both on the reversed injection end and the photoelectric conversion end while mainly depends on the relative change of the power in an optimization process. Therefore, it is preferable to stabilize the reversed injection and off-chip power collecting to suppress the external fluctuations with active locking of relative positions between the DUT, the 2D laser beam scanning module 104 and the photoelectric conversion module 102. More specifically, after the adjustable mount module is in position, and the arrayed driver module establishes the electric connections with high fidelity, the DUT is to a degree in a hull-down status, whose stability is now dependent on the entire test bed including the optical table or even the chassis of the system. Hence, additional test pairs from the emitting aperture to the bus waveguide with no phase adjustment or coherent combining is suggested for active stabilization during optimization so that external fluctuations could be compensated or accounted for. Additionally, when the spot-size converter of the bus waveguide is a high-performance grating coupler, the corresponding module shown in FIG. 10 may be directly deployed; and when the spot-size converter of the bus waveguide adopts an edge coupler, the testing specifications should require the client to deploy an additional test grating coupler tapping into the bus waveguide or otherwise providing trench information on the edge of the chip so that fiber with special end adaptors can be deployed into the trench to collect optical power.

And finally for the cases where the on-chip integration of photoelectric conversion module is viable, the photodetector is based on the principle of photoelectric effect, the junction region is designed to specifically adopt, but not limited to a p-i-n or p-n structure, the material of the junction region specifically adopts, but is not limited to a Ge—Si, doped Si, or III-V materials, photon-generated carriers are transported through the junction region, generating a photocurrent that can be measured from the electrodes of the photodetector. Again, since there are no significant requirements on the overall bandwidth in the calibration process, the photodetector and on-chip electric connection can adopt traditional designs that are readily available.

Here, we also provide guidelines on how the photoelectric conversion module can be deployed for batch calibration of packaged OPA transceivers (again shortened as DUT). Ideally, the DUT should possess on-chip or in-package photoelectric conversion module with a corresponding electric interface to measure the photocurrent and subsequently detect the optical power of the bus waveguide with or without tapping in the form of power splitters. Obviously, for such a DUT, the external photoelectric conversion module 102 is not required, corresponding photocurrent signal can be acquired through an independent probe or an electric switch for gated addressing. The photocurrent is then transmitted to a trans-impedance amplifier and an analog-digital converter and processed by an acquisition card of the upper computer. In case such on-chip or in-package photoelectric conversion module is not implemented, all the input ports of the OPA transceivers can be connected to a single optical switch, and the corresponding optical power from the bus waveguide of the current DUT is routed by the optical switch to the external photoelectric conversion module, the photocurrent of which is correspondingly subjected to trans-impedance amplification and analog-digital conversion, and is provided as a feedback signal to the upper computer. The electric switch and the optical switch can both adopt commercial solutions that are widely available, and therefore, the descriptions thereof are omitted.

The arrayed driver module 103 is connected to the phase shifters of the DUTs 107 to provide electric driving signals for the phase shifters. For wafer-level testing scenario, the arrayed driver module 103 includes a multi-channel programmable power source (PMU), a medium or large-scale densely-arrayed probe card depending on the scale of the DUT interfacing between the PMU and the DUT; and to achieve batch calibration for OPAs packaged in LiDAR transceivers, the on-board PMU, either co-integrated within the chip or co-packaged in the module by the original manufacturer, is accessed through the interface via the communication protocol specified by the original manufacturer for the calibration system to drive the DUT and adjust the phase shifters accordingly.

The medium or large-scale densely-arrayed probe card is commercially available and customizable given irregular electrode layout on the chip for the former case. While the on-chip or co-packaged PMU can be implemented with application-specific integrated circuits (ASICs) in a 2D or 3D integration scheme. For the latter case, a communication interface and a communication protocol corresponding to the driving of phase shifters must be provided by the client and configured in the upper computer as programming interfaces, and eventually permitting the adjustment of individual phase shifters.

During actual wafer-level testing procedures, the arrayed driver module 103 is deployed on the optical phased array chip 107 in the form of an arrayed probe card to hold down the optical phased array chip 107 in the testing area while ensuring electric connections to the phase shifters. Through the probe card, the PMU can perform circuit validation on the phase shifters and characterize their driving specifications. Note that the term phase shifter refers to the on-chip phase shifting unit and the local waveguide structure tuned thereby. The positioning of the arrayed driver module 103 is computer vision driven and of low precision requirements, similar approaches are used to establish electric connections during flying probe testing and are by nature general technologies.

Figure 9:
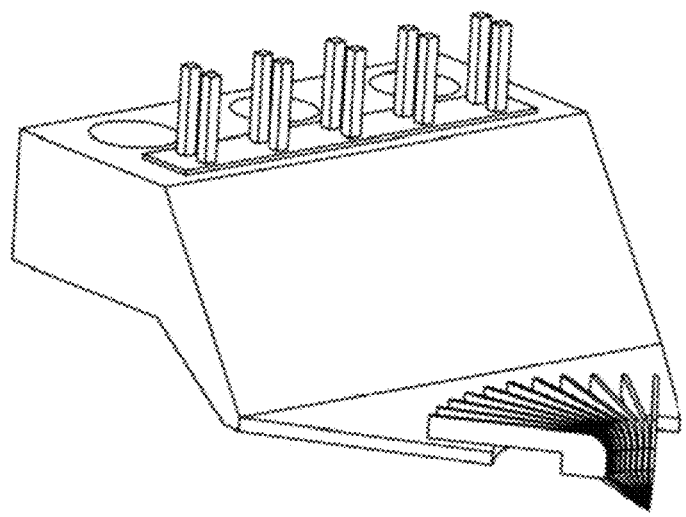
FIG. 9 shows one embodiment of an arrayed driver module in the present invention.

Specifically, as shown in FIG. 9, in an embodiment where a medium scale arrayed probe card is adopted, it is desirable that the driving circuit is capable to support a bandwidth from DC to GHz level. In practice, the arrayed probe card can adopt a commercial solution or a customized solution fabricated through processes including microprocessing or 3D printing. The geometric distribution of the tips of the arrayed probe card should be matched with that of the driving and testing electrodes on the optical phased array chip 107. The arrayed probe card moves to a corresponding position under the assistance of the camera via its actuated multi-axis mount in the X-Y direction, and then the Z axis descends to establish electric connection. Ideally, the I-V characteristics of the on-chip phase shifter units should be retrieved to ensure the reliability of the electric connection and diagnosis potential circuit faults. On the aforementioned basis, driving characteristics of all the channels as well as further bias and dark current characteristics of the photodetector can be acquired, and the preparation for electric driving of the optical phased array chip 107 is achieved.

For the batch calibration of packaged optical phased array transceivers, it has the electric connections and in some cases the corresponding integrated PMU. The validation and characterization of the electric connections should be completed by the client during packaging or before the calibration and should be stored in a memory in the onboard PMU if possible. The client should provide the definition of the communication interface and the communication protocol and may choose to disclose relevant driving characteristic data to facilitate the calibration. If there is no PMU inside the module, all electric interfaces should be connected to an electric switch so that each DUT can be addressed individually for calibration. In both cases, it is unnecessary to use the arrayed probe card to establish the connection between the multi-channel programmable power source and the optical phased array transceiver, and no deployment procedures are required.

The upper computer is connected to the arrayed driver module 103 and is used for accessing and controlling the PMU inside the arrayed driver module 103 to eventually drive the phase shifters in the optical phased array chip 107. Similarly, the upper computer is connected to the photoelectric conversion module 102 and is configured to read optical power measured by the photoelectric conversion module 102 and perform the optimization by using a phase compensation algorithm to obtain optimal driving signals required by all the phase shifters during beamforming at the current angle. By repeating the aforementioned process at different beamforming angles, a lookup table of driving signals required for beam scanning can be obtained, and thus, the purpose of correcting initial phase errors of the optical phased array chip 107 is achieved.

More specifically on the operations performed by the upper computer, an executable control program is built in the upper computer, and the control program is based on either one of following the phase compensation algorithms or their combinations, namely the golden-search-enabled rotating-element electric-field vector (REV) method, the hill-climbing algorithm, the simplex optimization method, or the Gaussian process-based search (GPS) so as to adjust phases of all the channels to maximize the optical power after coherent combining in the bus waveguide of the optical phased array chip 107.

As a side note, it is recommended to use the same type of controller and PMUs both as the drivers during testing and as the final co-packaged controlling circuits in the transceiver module, which helps to enhance to fidelity of the generated look up table.

With all modules introduced, implemented and their deployment guidelines provided, assuming that all the modules have been deployed and their relative positions locked, and the influences originated from environmental vibrations are sampled, averaged and inhibited, the calibration is carried out according to the following procedures. The arrayed driver module 103 adjusts the phase shifters to maximize the optical power reading obtained by the photoelectric conversion module 102 which is connected to the bus waveguide of the chip where the reversed injected laser wavefront sampled by the emitting aperture of the chip combines coherently based on the reciprocity of light propagation. For the specific optimization process, the aforementioned optimization algorithms and their combinations and even a specially-trained neural network may be adopted. The implementations of the aforementioned algorithms belong to general technologies and may be further customized, updated and adjusted according to the hardware capability and software objective of the final application.

If optimal driving parameters for beamforming at the target angle have been acquired, the reversed injection angle of the two-dimensional laser beam scanning module 104 is switched to the next target angle; and if the calibration process for all the resolvable points of the optical phased array chip 107 or all the angles required by the client have been completed, the wafer is moved by the adjustable mount module and the next optical phased array chip 107 is moved under the test setup to repeat the entire calibration process. A similar approach can be adopted for batch calibration of packaged modules, with details depending on the specifications of the module. In the above manner, the goal of the invention is fully realized with the aforementioned merits.

Finally, we provide a detailed description on the calibration method and especially its operating principle from a physical perspective. Note that the method is used in conjunction with the system above, where many schemes to implement, deploy and run the modules are already introduced. However, to keep the method self-explanatory and to provide a general picture on how the method drives the entire application, some redundant descriptions are made below concerning how the modules are configured, positioned and operated, though with a focus on the workflow.

An embodiment of the present application provides a calibration method for OPA chips, by which phase errors are compensated by tuning the on-chip phase shifters according to the optical power feedback from the system. At the component level, effective refractive indexes of waveguides within the phase shifters are changed by virtue of the thermo-optical effect or the electro-optical effect, and thus, corresponding optical path lengths and phase shifts experienced by the light when passing through the phase shifter region are changed.

For beamforming at a specific angle, which is the process of tuning all phase shifters in individual channel in the OPA, a process flow chart is provided in FIG. 2 which includes two major steps:

Step S201: collimated laser is reversely injected to a to-be-calibrated optical phased array chip (the current DUT), and coherent beam combination is performed within the DUT.

The collimated laser is reversely injected to the DUT by adjusting the position of the two-dimensional laser beam scanning module under the video feedback from the infrared microscopic observation module and the optical power feedback from the photoelectric conversion module. By using the two-dimensional laser beam scanning module, the collimated laser may be adjusted to the current beamforming angle and aimed at the emitting aperture of the OPA chip.

More specifically, when the collimated laser is reversely injected to the DUT, wherein the coarse adjustment step compensates the horizontal (X/Y) displacement due to change in the input angle by deriving an overlap ratio between the light spot of the collimated laser and the array emission aperture guided by computer vision; and the fine adjustment step comprises acquiring the optical power from the bus of the DUT, and maximizing the power by adjusting the relative positions of the DUT and the two-dimensional laser beam scanning module. The optical power information is measured by the photoelectric conversion module used in the calibration system.

Step S202: driving parameters, especially the driving signals applied to phase shifters of the DUT are adjusted to maximize the optical power output from the bus waveguide of the DUT, thereby achieving phase alignment of the chip for the current angle. A phase relationship among channels may be changed by changing the phase shifters.

The tuning of the phase shifters in the DUT includes the following steps: collimated laser is reversely injected from the current beamforming angle, the optical power after coherent combining in the bus waveguide is acquired, and optimization is performed by using a phase compensation algorithm to obtain the optimal driving signals required by all the phase shifters.

The phase compensation algorithm is realized with either the golden-search-enabled rotating-element electric-field vector (REV) method, the hill-climbing algorithm, the simplex optimization method, or the Gaussian process-based search (GPS).

To understand how the method performs the calibration based on the reciprocity of light propagation, background information is provided on the beamforming of OPAs during forward emission. In order to synthesize a beam in a target direction, which ideally possesses a parallel wave-front perpendicular to the direction of the beam, phased array elements should have a phase distribution corresponding to the wave-front sampled by the geometric definition of the array. This phase distribution is denoted by $\phi_{S,n}$, herein, S represents a sample, n represents a $n^{th}$ channel, and a vector containing the phase values of all channels are marked as $\Phi_S$. Note that the wave-front also contains amplitude information, which may be similarly marked as $a_n$, though it should be emphasized that amplitude distribution in phased array beamforming is not indispensable, except that better beam quality including an improved side-mode suppression ratio can be achieved through a amplitude taper similar to the effect of a window function. Similar observations are also made in other disciplines such as that image processing, where the image can be reconstructed solely based on the phase information, while the amplitude distribution mainly affects the contrast of the reconstruction. From a phased array perspective, amplitude calibration is not available for a passive array, though an active array may adaptively adjust the amplitude distribution of the array elements according to the application to achieve flexible and enhanced detection. The proposed method is dedicated to the phase error calibration which forms the basis for advanced beamforming such as amplitude calibration and tapering. Therefore, the amplitude distribution of the channels in the present invention is not regarded as a calibration object, and amplitude-related symbols are only reserved for the purpose of representation integrity.

For the calibration of a specific OPA chip, the inconsistency, referring to the phase errors, in the system is unknown but static, and can originate from multiple aspects including the non-uniformity of the wafer, the process quality of the photonic integrated circuit and sometimes suboptimal component and circuit designs. However, the phase error in each channel is a sum of channel phase errors caused by the aforementioned factors and may be denoted by $\phi_{E,n}$, herein, E represents an error, and the corresponding vector is denoted by $\Phi_E$.

Figure 5:
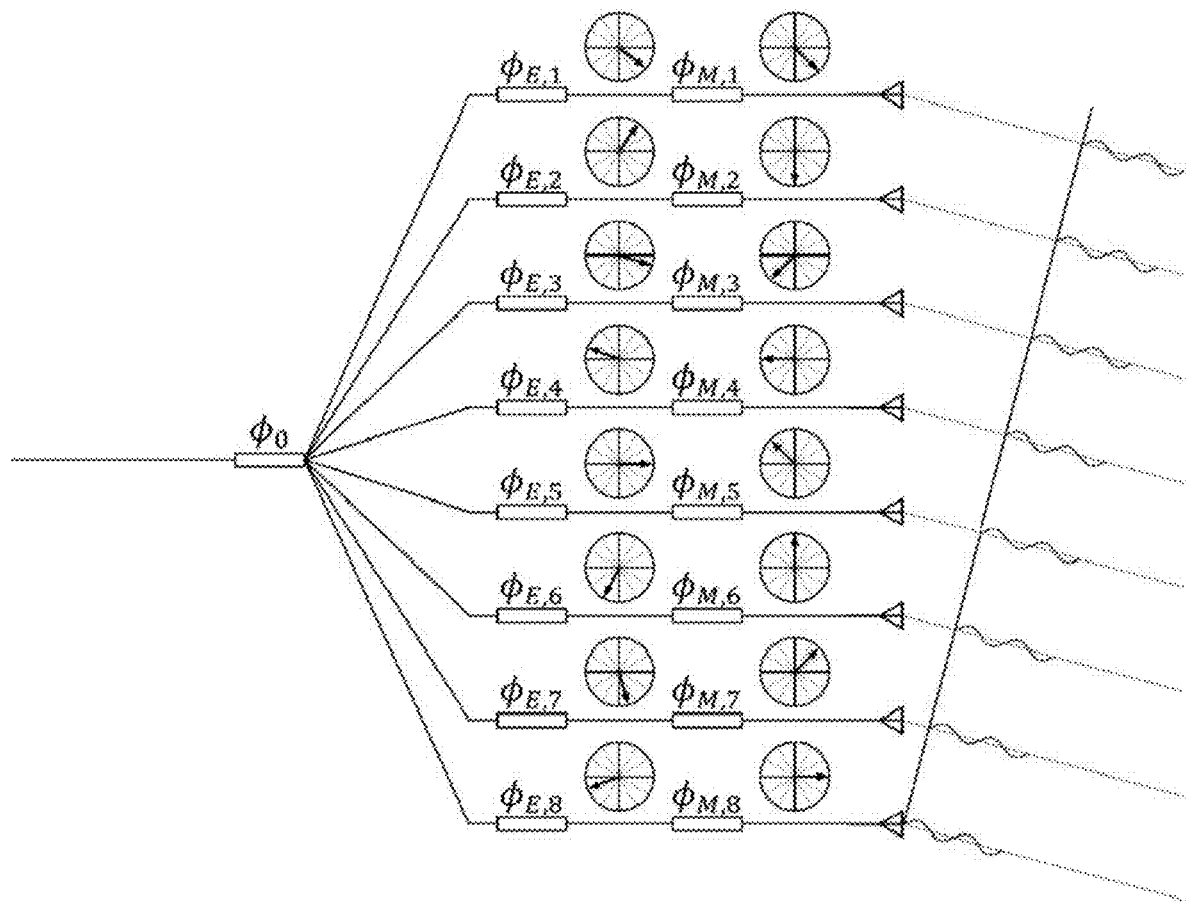
FIG. 5 shows the theoretic proof for the rotating-element electric-field vector (REV) method based on triangle inequality in vector addition in the present invention.

Therefore, the beamforming or phase alignment process calibrates the phases of OPA channels so that the array elements fit the desired phase distribution $\Phi_S$ in spite of $\Phi_E$. Note that the related arts, namely the optical phased arrays or the phased arrays, belong to the field of general technologies, and meanwhile, emerging integration platforms may use liquid crystal or piezoelectric phase shifters of different working principles, the beamforming and the calibration process is the same in nature. The calibration method may be adapted to the aforementioned different phase tuning means by using the corresponding driving resources. In addition, there could be non-uniformity among the phase shifter units. The phase deviation caused by the implementation of the phase shifter unit, i.e., its passive phase shift, is accounted for by the static phase error sum. Meanwhile, inconsistency in the dynamic driving characteristics of a phase shifter is compensated in a feedback manner in the calibration process and is recorded in the final lookup table. The phase shift actively introduced by the phase shift as well as its driving characteristics is denoted by $\phi_{M,n}$, M represents modulation, the vector for these values is denoted by $\Phi_M$.

and a block diagram on the relationship between the sampled phase front, the phase errors, and the tuned phases is shown in FIG. 5.

Figure 6:
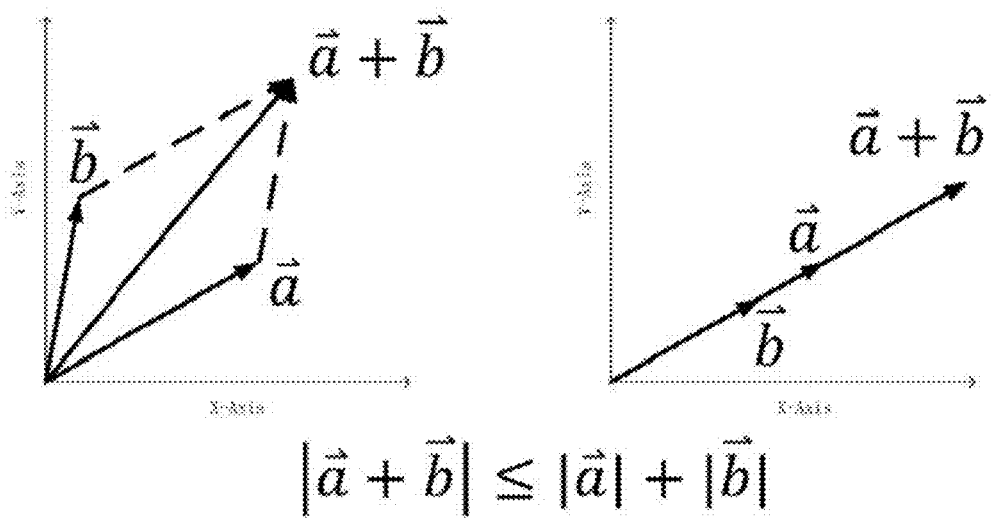
FIG. 6 shows the structure of one embodiment of the wafer-level testing system in the present invention.

With the above notations, assuming that a common initial phase before the power splitting is 0 or $\phi_0$, it can be derived that the beamforming condition for forward emission is: $\Phi_S=\phi_0-\Phi_E-\Phi_M$, where the negative sign represents a phase delay. On this basis, a phase vector of a reversed injection optical field sampled by the array is denoted as $\Phi_{RS}=-\Phi_S$, wherein R represents reverse. Based on the reciprocity of light propagation, by conforming to the conjugation characteristic of complex electric fields during reversible transformation a negative sign is added to the sampled phase front. And a phase vector containing the phases of all the channels before the coherent combining is denoted by $\Phi_P$, wherein P represents post reversed propagation. Since the phase delays brought by the phase errors and the phase modulation is also experienced by the reversed propagation, their phase contributions are correspondingly subtracted as $\Phi_P=\Phi_{RS}-\Phi_E-\Phi_M$. The expression for the coherent combining in the bus waveguide, which is the sum of complex electric fields from all the channels is, $E_B^+=\sum_{n=1}^{N} E^*_{P,n}=\sum_{n=1}^{N}\alpha_n \exp(j\phi_{P,n})=\sum_{n=1}^{N} a_n \exp(j(\Phi_{RS}-\Phi_E-\Phi_M))$. This sum of complex electric fields can be visualized as vector addition in the complex plane as shown in FIG. 6, or in other words, this complex sum is the successive connection of multiple vectors each with a length corresponding to the amplitude while oriented in an angle corresponding to the phase in a 2-D plane. Further, it can be iteratively proved based on the principle of triangle inequality that only when all the vectors are in the same direction, i.e., the $\Phi_P$ is of the same value, the module of the vector sum can be maximized, that is $\phi_{P,n}\equiv\phi_{P,m}$ s.t.n, m∈N, abs $(E^*_B)\rightarrow$maximum. The module of the vector sum, which is the amplitude of the coherently combined complex electric field, is positively correlated to the optical power. Therefore, by maximizing the optical power after coherent combining, individual channels become in phase with each other. Apparently, the equality $\phi_{P,n}\equiv\phi_{P,m}\equiv\phi_P=-\phi_0$ is not necessarily met, however, a beamforming condition corresponds to a phase relationship among array elements in a phased array, that is, the aforementioned phase distribution instead of a specific phase value, and therefore, for a beamforming purpose, a constant bias between the common initial phase for forward emitting and the common initial phase for reversed injection will not jeopardize or deteriorate the quality of the beamforming, which may be neglected. To put it in formula, if it is denoted by $\phi_P=-\phi_0+\phi_B$, B represents the constant bias, there is an equality that $\phi_0=\phi_B-\phi_P$, since the calibration is expressed as $\Phi_{RS}-\Phi_E-\Phi_M=\Phi_P$, there is an equality that $\phi_0-\Phi_E-\Phi_M=\phi_B-\phi_P-\Phi_E-\Phi_M=\phi_B-\Phi_{RS}=\Phi_S+\phi_B$ during forward emission, where the phase bias is now added to all channels and shared by all elements, which does not change the inter-channel phase relationship and has no influence on the beamforming process. In summary, after calibrating the phase errors with the reversed injection setup, which introduces the optimal the $\Phi_M$ to the array by maximizing the optical power in the bus waveguide, the phase relationship for forward emission now satisfy the sampled phase front for beamforming in the target direction with a scalar bias added to all channels, and the beamforming in the current direction is achieved.

Figure 7:
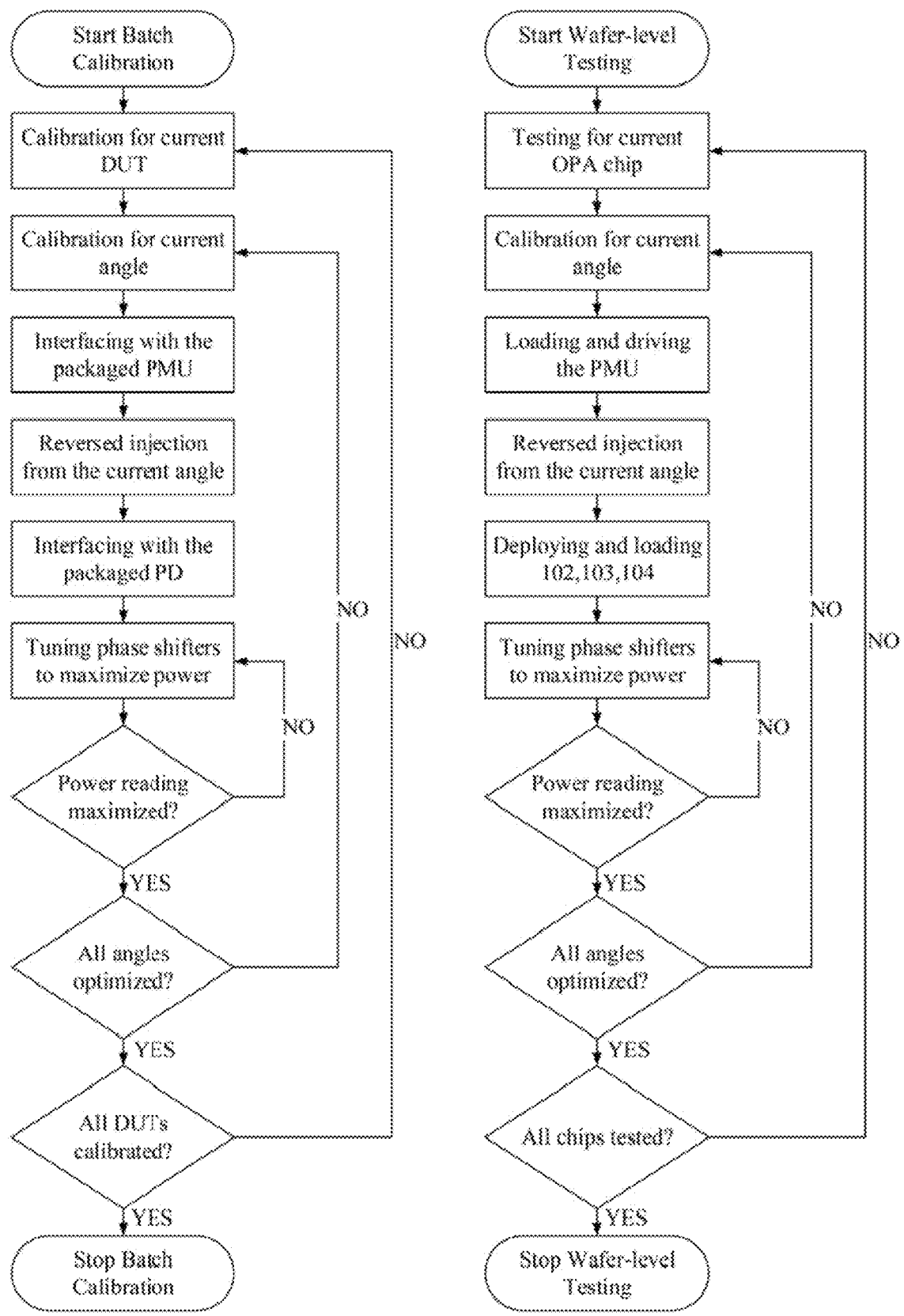
FIG. 7 is a process diagram showing wafer-level characterization in the present invention.
Figure 8:
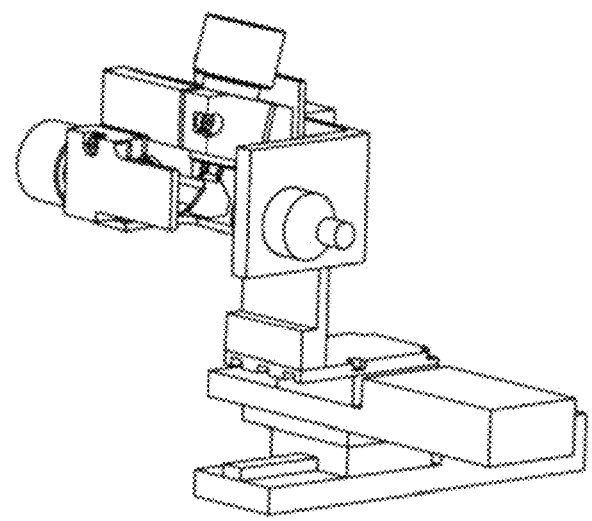
FIG. 8 shows one embodiment of the two-dimensional laser beam scanning module performing reversed injection in the present invention.

Combining the theoretical proof and the experimental configurations, the wafer-level testing for OPA chips is summarized as the flow chart on the right as shown in FIG. 7, and a batch calibration process for LiDAR transceiver modules with packaged OPAs is shown as the left diagram in FIG. 7.

In conclusion, the system and method provided in this invention decoupled the free space beam quality evaluation process from the optimization process based on the reciprocity of light propagation. In its place, the optical power in the bus waveguide after coherent combining is used as the feedback signal for the optimization. The testing speed bottleneck originated from the frame rate of an infrared camera is eliminated, which is exceptionally valuable for accelerating the calibration for large-scale optical phased arrays, and the degree of automation and availability of the testing process are increased significantly. Finally, the system and the method can be readily understood and implemented by personnel in the same art.

The aforementioned contents are only preferred embodiments of the present invention but are not intended to limit the present invention. Any modifications, equivalent replacements, improvements and the like made within the spirit and principle of the present invention shall fall within the protective scope of the present invention.

We claim:

1. A calibration method for optical phased array (OPA) chips, comprising:
    (1) providing a calibration system for calibrating an OPA chip for a target beamforming angle, wherein the calibration system comprises an infrared microscopic observation module, a two-dimensional laser beam scanning module, an adjustable mount module, a photoelectric conversion module, an arrayed driver module, and an upper computer; the adjustable mount module, the arrayed driver module, and the two-dimensional laser beam scanning module are arranged from bottom to top in the calibration system; and the OPA chip comprises a bus waveguide at an input end and an emission aperture at an output end, a power splitting network of channels in connection with an array of waveguides and an array of phase shifters for channel-wise phase control of the waveguides between the input and output ends,
    the two-dimensional laser beam scanning module is mounted above the OPA chip and adapted to emit a collimated laser at adjusted angles to the OPA chip,
    the infrared microscopic observation module is mounted above the OPA chip and adapted to acquire spot image of the collimated laser on surface of the OPA chip and send feedback on the position of the acquired spot image,
    the adjustable mount module is movably mounted with the OPA chip,
    the photoelectric conversion module is a photoelectric detector that is connected to the bus waveguide of the OPA chip and adapted to measure optic power output from the bus waveguide at the input end of the OPA chip,
    the arrayed driver module comprises a multi-channel programmable power source (PMU) and a medium or large-scale densely-arrayed probe card, the medium or large-scale densely-arrayed probe card is connected to the phase shifters of the OPA chip and serves as an interface between the PMU and the arrayed phase shifters of the OPA chip, and the arrayed driver module is adapted to provide driving signals to adjust the phase shifters of the OPA chip for phase error compensation of the OPA chip,
    the upper computer is connected to the arrayed driver module for accessing and controlling the PMU inside the arrayed driver module and driving the phase shifters in the OPA chip and is connected to the photoelectric conversion module for reading optical power output measured by the photoelectric conversion module and performing optimization of the optical power output, and
    each of the arrayed phase shifters of the OPA chip comprises a tunable waveguide section with electric connection and an optical field control mechanism, the tunable waveguide section of the arrayed phase shifters receive external electric control signals via the electric connection with the densely-arrayed probe card and convert the electric control signals into optical path changes to the waveguides,
    (2) moving the OPA chip to a test region by the adjustable mount module,
    (3) irradiating the collimated laser from the two-dimensional laser beam scanning module set at a target beamforming angle to the emission aperture of the OPA chip, observing and sending feedback on the position of the spot image of the collimated laser on the surface at the emmission aperture of the OPA chip by the infrared microscopic observation module, and adjusting the collimated laser based on the feedback from the infrared microscopic observation module so that the spot image of the collimated laser is aligned with the emission aperture of the OPA chip,
    (4) reversely injecting the collimated laser to the emission aperture of the OPA chip and performing coherent beam combination on the collimated laser within the OPA chip based on reciprocity of light propagation, coupling the collimated laser in the bus waveguide at the input end of the OPA chip, and measuring optical power output from the bus waveguide by the photoelectric conversion module, wherein the optical power output from the bus waveguide of the OPA chip is positively correlated to amplitude of the coherently combined electric field of all channels in the OPA chip,
    (5) dynamically adjusting driving parameters of the phase shifters of the OPA chip based on the optical power output from the bus waveguide measured by the photoelectric conversion module to maximize the optical power output from the bus waveguide of the OPA chip, and achieving phase alignment of the OPA chip, wherein the driving parameters comprise inter-channel phase relationship of the OPA chip, and a phase compensation algorithm is used to obtain optimal driving signals required by all phase shifters.

2. The calibration method of claim 1, when the collimated laser is adjusted for reversed injection by a coarse adjustment step and a fine adjustment step,
    wherein the coarse adjustment step comprises:
    compensating horizontal (X/Y) displacement due to change in input angle by deriving a geometric overlap ratio between a light spot of the collimated laser and the emission aperture guided by computer vision based on the infrared microscopic observation module, and
    the fine adjustment step comprises:
    measuring the optical power output from the bus waveguide and maximizing the optical power output by adjusting relative positions of the OPA chip and the two-dimensional laser beam scanning module.

3. The calibration method of claim 1, wherein when the driving parameters of the optical phased array chip are adjusted, the adjusted parameters comprise phase compensation values of phase shifters of the OPA chip.

4. The calibration method of claim 3, wherein adjusting the phase compensation values of the phase shifters comprises the following steps:

reversely injecting the collimated laser from the target beamforming angle, acquiring the optical power from the coherent beam combination in the bus waveguide, and performing optimization to maximize the acquired optical power by using a phase compensation algorithm to obtain optimal electric driving signals required by all phase shifters for beamforming at the target beamforming angle.

5. A calibration system for OPA chips for wafer-level testing of OPA chips and batch calibration of packaged OPAs in LiDAR transceivers according to claim 1, comprising:

the infrared microscopic observation module used to acquire the spot image of the collimated laser on the surface of the OPA chip during the coarse adjustment for reversed injection;

the two-dimensional laser beam scanning module used for irradiating the collimated laser and capable of adjusting an emitting or injection angle of the collimated laser;

the adjustable mount module used for holding and moving the OPA chip;

the photoelectric conversion module used to measure the optical power output from the coherent beam combination in the bus waveguide of the OPA chip;

the arrayed driver module connected to phase shifters of the OPA chip to provide electric driving signals for phase error compensation; and the upper computer connected to the arrayed driver module and used for accessing and controlling the arrayed driver module to finally tune the phase-shift in the OPA chip and store driving parameters after optimization.

6. The calibration system of claim 5, wherein the infrared microscopic observation module comprises:

an actuated multi-axis mount for angular and positional adjustment;

a microscope; and an infrared camera, connected with a lens barrel of the microscope by a camera adapter, wherein the lens barrel of the microscope is fixed to the actuated multi-axis mount.

7. The calibration system of claim 5, wherein the two-dimensional laser beam scanning module is based on either a galvanometer laser beam scanner or a pre-calibrated OPA beam-steerer and is used for the reversed injection of the collimated laser.

8. The calibration system of claim 5, wherein, for wafer-level testing, the arrayed driver module comprises:

the multi-channel programmable power source, and the medium or large-scale densely-arrayed probe card depending on scales of the OPA chip, interfacing between the PMU and the OPA chip so as to drive and adjust the phase shifters, while for batch testing of packaged OPAs, the arrayed driver module comprises:

the PMU, either co-integrated within the chip or co-packaged in the transceiver by an original manufacturer, and is accessed through an interface with a communication protocol specified by the original manufacturer for the calibration system to drive the OPA chip and adjust the phase shifters accordingly.

9. The calibration system of claim 5, wherein the photoelectric conversion module is connected to the bus waveguide of the optical phased array chip in the form of a photodetector.

10. The calibration system of claim 5, wherein the adjustable mount module comprises a clamping unit and an actuated six-axis positioning stage, and the clamping unit provides mechanical adaptation between the OPA chip and the actuated six-axis positioning stage.

\* \* \* \* \*